(12) United States Patent
Tao et al.

(10) Patent No.: US 7,924,803 B2
(45) Date of Patent: Apr. 12, 2011

(54) ANTENNA SELECTION FOR MOBILE STATIONS IN OFDMA NETWORKS

(75) Inventors: Zhifeng Tao, Allston, MA (US); Jinyun Zhang, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 746 days.

(21) Appl. No.: 11/937,697

(22) Filed: Nov. 9, 2007

(65) Prior Publication Data

US 2009/0122777 A1    May 14, 2009

(51) Int. Cl.
*H04B 7/208* (2006.01)
*H04J 1/00* (2006.01)
*H04J 4/00* (2006.01)
*H04L 5/14* (2006.01)
*H04W 4/00* (2009.01)

(52) U.S. Cl. ........ 370/344; 370/281; 370/295; 370/330; 370/436; 370/478; 370/480

(58) Field of Classification Search ................ 370/281, 370/295, 330, 343, 344, 436, 478, 480
See application file for complete search history.

(56) References Cited

U.S. PATENT DOCUMENTS

| | | | | |
|---|---|---|---|---|
| 2002/0172163 A1* | 11/2002 | Chen et al. | | 370/281 |
| 2003/0081577 A1* | 5/2003 | Jimenez | | 370/336 |
| 2005/0207451 A1* | 9/2005 | Partyka | | 370/503 |
| 2006/0141949 A1* | 6/2006 | Varshney et al. | | 455/101 |
| 2006/0205356 A1* | 9/2006 | Laroia et al. | | 455/66.1 |
| 2008/0043610 A1* | 2/2008 | Li et al. | | 370/203 |
| 2009/0109835 A1* | 4/2009 | Green | | 370/210 |

* cited by examiner

*Primary Examiner* — Ronald Abelson
(74) *Attorney, Agent, or Firm* — Dirk Brinkman; Gene Vinokur

(57) ABSTRACT

A method and a system for selecting antennas in an orthogonal frequency division multiple access (OFDMA) network. The network includes a base station and mobile stations. The mobile station includes multiple antennas. The base station and the mobile stations communicate with each other using frames. The base station transmits a down-link (DL) subframe of the frame to the mobile station. The DL subframe allocates one or more symbols and one or more subcarriers of an up-link (UL) subframe of the frame for antenna selection signals. The mobile station transmits the UL subframe including the antenna selection signals at the allocated subcarriers and symbols to the base station. Then, the base station selects a subset of the antennas based on the antenna selection signals.

13 Claims, 14 Drawing Sheets

ANTENNA SELECTION FOR MOBILE STATIONS IN OFDMA NETWORKS

FIELD OF THE INVENTION

This invention relates generally to wireless networks, and more particularly to antenna selection for mobile stations in OFDMA networks.

BACKGROUND OF THE INVENTIONS

Orthogonal Frequency-Division Multiplexing (OFDM)

OFDM uses multiple orthogonal subcarriers to transmit information at a relatively low symbol rate. As an advantage, OFDM can withstand severe changes in channel state and quality, such as high frequency attenuation, narrowband interference, and frequency-selective fading due to multipath, using a single carrier. Channel equalization is simplified because OFDM uses slowly-modulated narrowband signals rather than one rapidly-modulated wideband signal. A low symbol rate enables guard intervals and time-spreading, while reducing inter-symbol interference (ISI). Some of the subcarriers in some of the OFDM symbols carry sounding signals for estimating the channel state, and for performing synchronization.

Orthogonal Frequency Division Multiple Access (OFDMA)

As a disadvantage, OFDM does not provide multi-user channel access to a channel. OFDMA provides this capability by time, frequency or coding separation of multiple users. That is, frequency-division multiple access is achieved by assigning different OFDM subchannels to different users (mobile stations). A subchannel is a group of subcarriers, which need not be contiguous. OFDMA is used in the uplink of networks according to the IEEE 802.16 Wireless MAN standard, commonly referred to as WiMAX. Some common terms used in the standards and herein are defined in the Appendix Sounding In order to allocate the frequencies of the subchannels and subcarriers most efficiently, the mobile station can transmit sounding signals. The base station can obtain channels state information (CSI) from the sounding signals, and allocate the frequencies accordingly.

The IEEE 802.16 standards define sounding signals for the uplink (UL) from mobile stations to the base station. Two types of carrier allocations are defined: non-distributed subcarrier allocation (Type A), and distributed subcarrier allocation (Type B).

Type A, which is mandatory in the current WiMAX forum profile, provides for mobile station multiplexing, decimated separability, and cyclic shift separability. Multiple antennas are only supported when the number of antennas is equal to the number of RF chains.

Type B, which is optional in the WiMAX forum profile does not allow mobile station multiplexing and does not support multiple antennas.

Antenna Selection

Networks according to the IEEE 802.16 standards support multiple antennas and radio frequency (RF) chains in base stations (BSs) and mobile stations (MSs). Due to the high cost of RF chains and relatively low cost of antennas, the number of RF chain (N) can be less than the number of antennas (M), that is, $N \leq M$. However, as stated above, both Type A and B do not support antenna selection.

Therefore, it is desired to select antennas in OFDAM networks. However, the current OFDAM standards, as described above, do not support sounding for the purpose of antenna selection. Therefore, it is desired to adapt the current sounding signals for the purpose of antenna selection.

SUMMARY OF THE INVENTION

The embodiments of the invention provide a method to facilitate channel estimation for antenna selection in an OFDMA network. Upon being instructed by the base station, a mobile station transmits an antenna selection signal in a sounding zone of an uplink subframe of an OFDMA frame. The base station can acquire channel state information (CSI) associated with the wireless channel between the base station and the transmitting antenna(s) at the mobile station, based upon the antenna selection signal. The base station can select a subset (one or more) of the available antennas at the mobile station based upon the CIS thus obtained.

DETAILED DESCRIPTION OF THE PREFERRED EMBODIMENTS

Antenna Selection

Figure 1A:
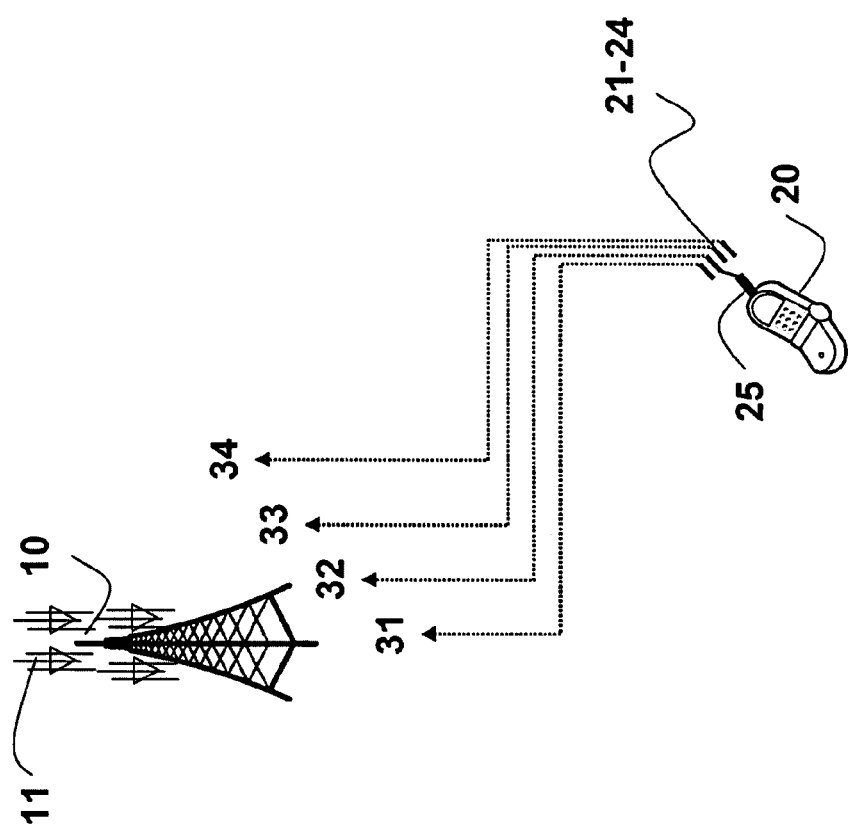
FIG. 1A is a schematic of antenna selection according to embodiments of the invention.

FIG. 1A shows a base station 10 and a mobile station 20. Typically, the base station 10 includes a large number of antennas 11 and other RF components not shown. As defined herein, the mobile station is capable of moving. The mobile station (MS) is also known as the "user" or subscriber equipment.

The mobile station includes multiple (two or more) M antennas 21-24 and a set (one or more) of N RF chains 25. The RF chains are connected to a subset (one or more) of the plurality of antennas according to the embodiments of our invention using antenna selection signals. The subset can include all of the available antennas.

Associate with the multiple antennas 21-24 are corresponding channels 31-34. Each antenna provides a different propagation path or channel that experiences a distinct channel gain. Therefore, it is important to selectively connect N (a subset) of the multiple M antennas to the RF chains so that the transmitting and receiving performance at the BS and the MS is optimized.

This function is known as antenna selection (AS). Antenna selection is a method to improve system performance in terms of bit error rate (BER), signal to noise ratio (SNR) and throughput (TH).

OFDMA Network

Figure 1B:
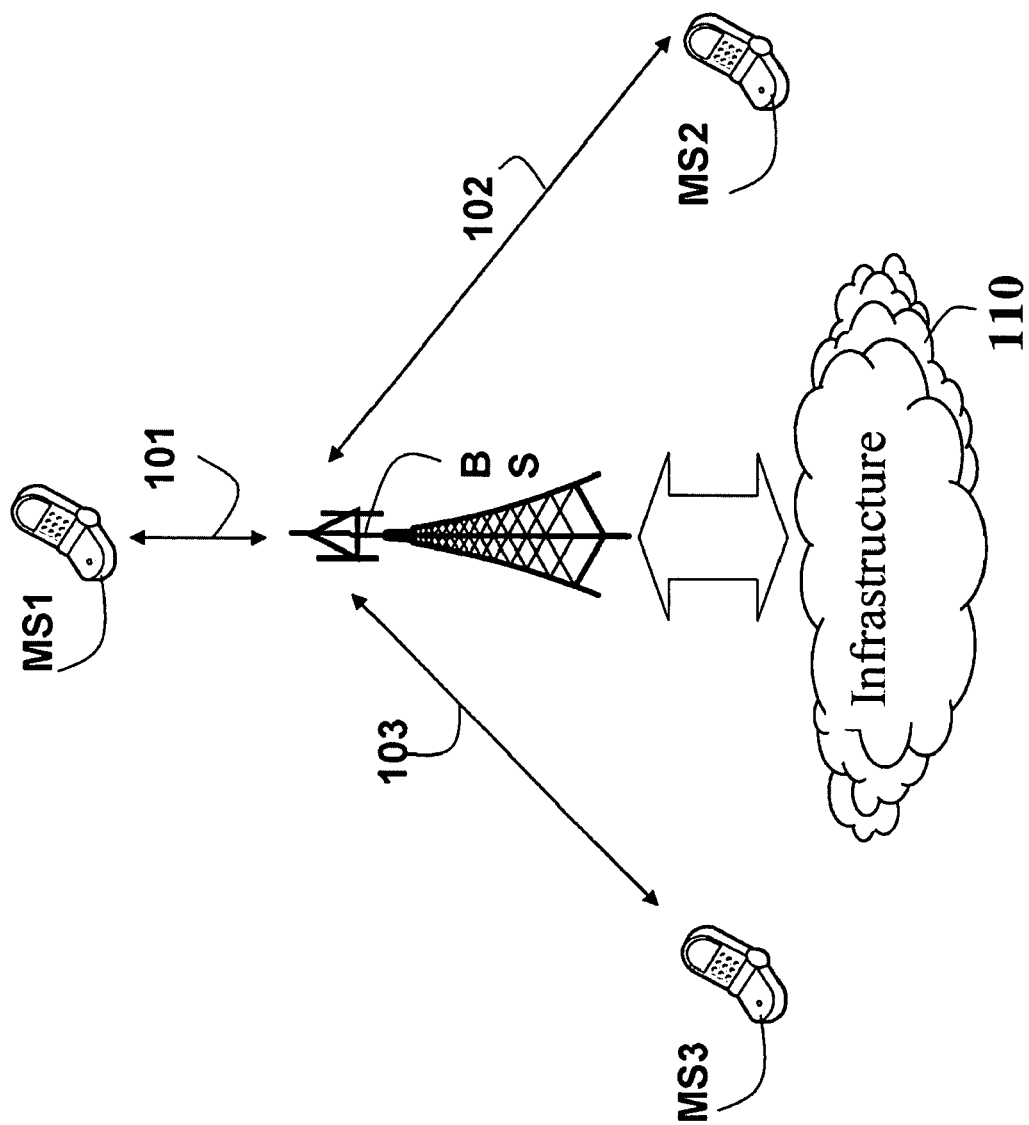
FIG. 1B is a schematic of an OFDMA network used by embodiments of the invention.

FIG. 1B shows an OFDMA network used by our invention. The network uses point-to-multipoint communications between the BS, and the mobile stations MS1, MS2 and MS3. The BS manages and coordinates all communications with the MS1-MS3 in a particular cell on connections (channels) 101-103, respectively. Each MS is in direct communication with one BS, and the BS communicates with other base stations via an infrastructure 110 or "backbone" of the network.

Frame Structure

Figure 2:
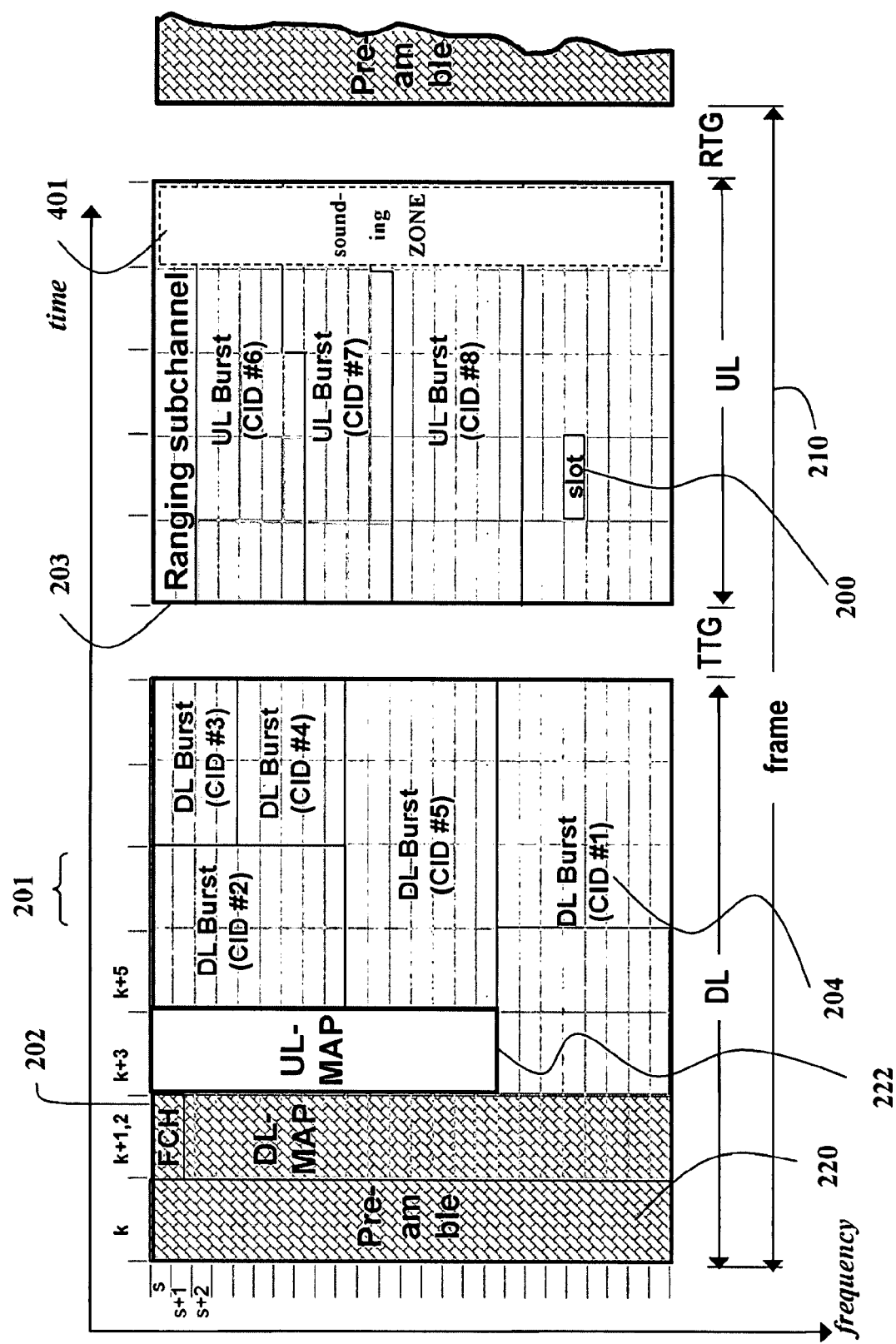
FIG. 2 is a block diagram of an OFDMA frame structure used by embodiments of the invention.

FIG. 2 shows a frame structure used for OFDMA channel access by the cooperating BS and MS according to our invention. In FIG. 2, the horizontal axis indicates time, and the vertical axis subchannels (frequency).

The basic unit of resource for allocation in OFDMA is a slot 200. The size of the slot is based on the permutation modes that the MS and the BS use for transmissions in uplink and downlink. A permutation mode defines the type of resource allocation in time and frequency domains. Different modes are defined for the UL and the DL. By using a specific permutation, a given number of OFDMA symbols 201, and subcarriers are included in each slot.

The slot has an associated time (k) and subchannel (s). The subchannels can further be partitioned into subcarriers. Each slot can carry one or more symbols. The base station partitions time into contiguous frames 210 including a downlink (DL) subframe and an uplink (UL) subframe.

During the downlink subframe, all traffic is in the downlink direction, i.e., from the base station to the mobile stations. During the uplink subframe, all traffic is in the uplink direction, i.e., from the mobile stations to the base station.

The DL subframe starts with a preamble 220 on all subcarriers, which enables the mobile stations to perform synchronization and channel estimation. The first subchannel in the first two OFDMA symbols in the downlink is the frame control header (FCH) 202. The FCH is transmitted using QPSK rate ½ with four repetitions. The FCH specifies a length of the immediately succeeding downlink MAP (DL-MAP) and the repetition coding used for the DL-MAP.

The BS uses the downlink MAP (DL-MAP) and an uplink MAP (UL-MAP) 222 to notify the MSs of the resources allocated to data bursts 204 in the downlink and uplink direction, respectively, within the current frame. The bursts are associated with connection identifiers (CID). Based upon a schedule received from the BS, each MS can determine when (i.e., OFDMA symbols) and where (i.e., subchannels) the MS should transceive (transmit or receive) with the BS. The first subchannels 203 in the UL subframe are used for ranging.

The UL-MAP 222 for the purpose of antenna selection is described in greater detail below. Specifically described is the use of the UL-MAP to specify a sounding zone 401.

The receive/transmit gap (RTG) separates the frames, and the transmit transition gap (TTG) separates the subframes within a frame. This enables the transceivers to switch between transmit and receive modes.

Data signals (OFDMA symbols) are transmitted in bursts 204 comprising one or more slots.

Figure 3:
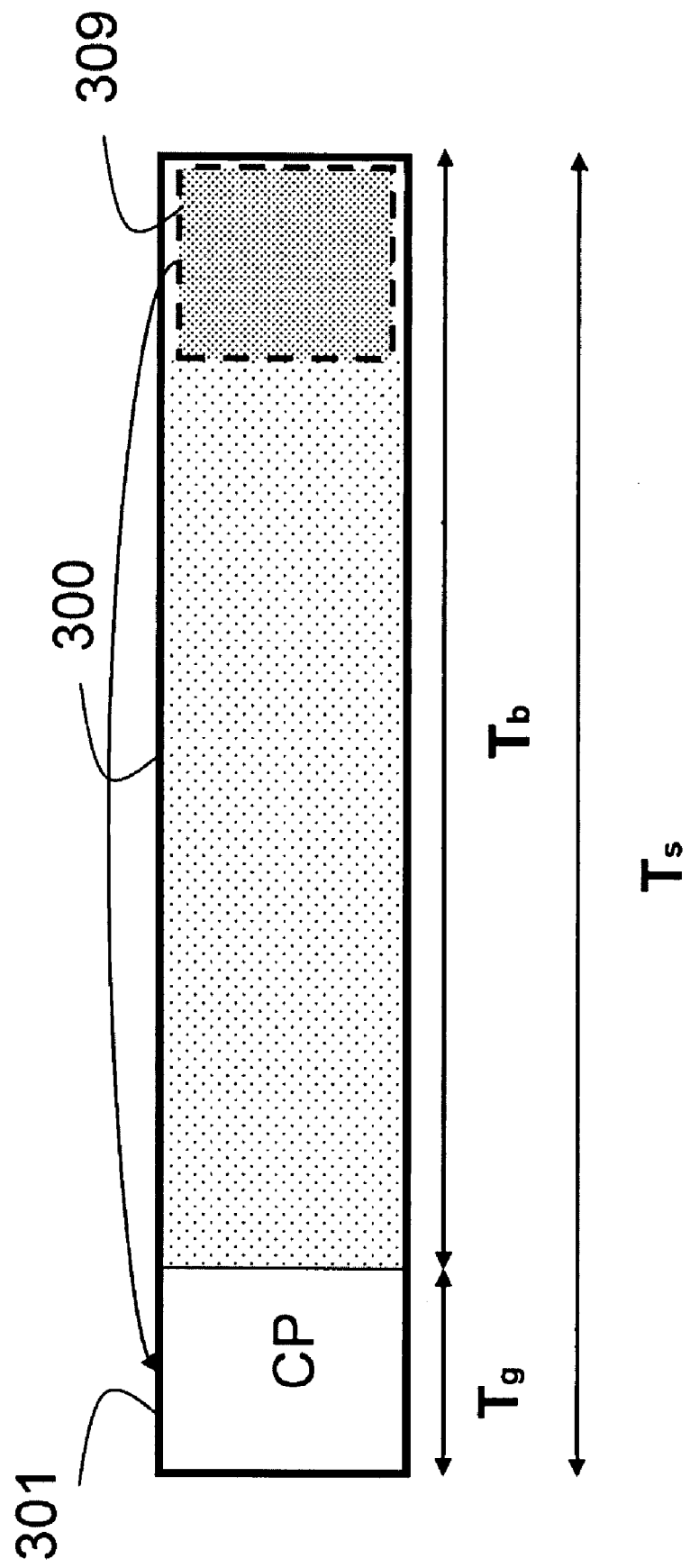
FIG. 3 is a schematic of an OFDMA symbol used by embodiments of the invention.

FIG. 3 shows a structure of an OFDMA symbol 300 used by embodiments of the invention. $T_s$ is the symbol duration, $T_b$ is the information (data) duration and $T_g$ is the cyclic prefix CP 301 The CP 301 is derived from the data 309 at the end of $T_b$, which are copied to the beginning of the symbol. $T_g$ is a configurable time period and is approximately a few microseconds long. The frequency subcarriers are generated by a fast Fourier transform (FFT) to construct the complete frequency spectrum. Frequency subcarriers are classified into groups according to different uses, such as DC, data, and sounding and guard subcarriers.

Uplink Channel Sounding for Antenna Selection

Figure 4:
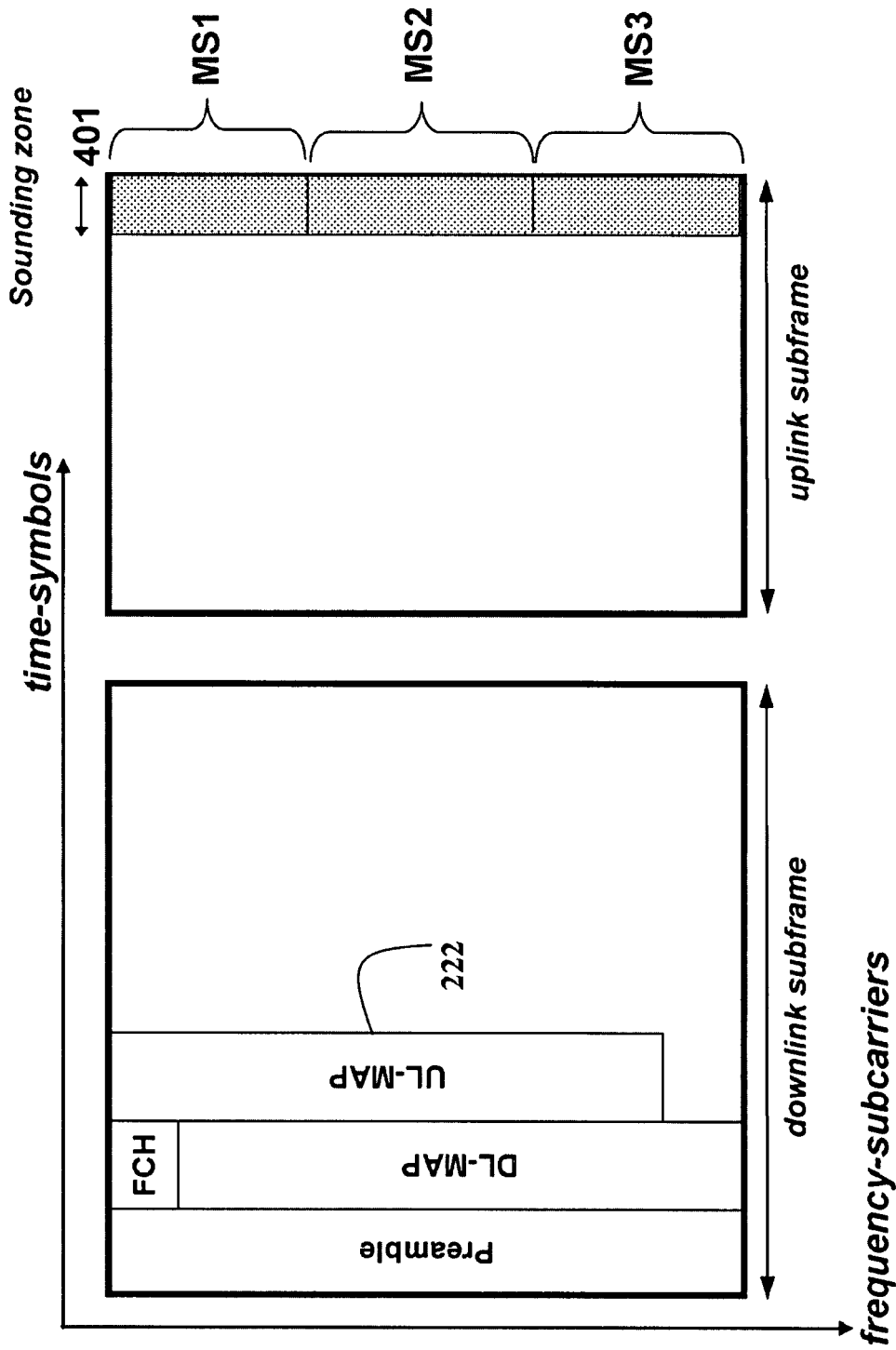
FIG. 4 is a schematic of the uplink sounding zone used by embodiments of the invention.

As shown in FIG. 4, the MS can transmit antenna selection channel sounding signals in a sounding zone 401 of the uplink subframe of the OFDMA frame. The sounding zone is specified in the UL-MAP 222.

The antenna selection signals enable the BS to determine the channel response for the uplink. The sounding zone can span a number of consecutive OFDMA symbols, and includes all subcarriers in the frequency dimension.

In the sounding zone, each MS is allocated a set of the subcarriers on which to transmit the antenna selection signals. Thus, multiple MSs can sound concurrently, e.g., MS1, MS2, and MS3. FIGS. 8-12 show variations of antenna selection signals in the sounding zone 401.

The channel state information (CSI) obtained from the antenna selection signals can also be used for downlink transmission, given the uplink and downlink channel are reciprocal, and the transmit and receive hardware at the base station is calibrated. Sounding also enables the BS to determine the quality of the channel response across the signal bandwidth for the purpose of frequency scheduling.

The uplink channel antenna selection signals are also used for antenna selection according to embodiments of the invention.

Motivation for Using Uplink Sounding for Antenna Selection at the MS

As shown in FIG. 1A, the MS 20 has a set (one) of RF chains 25 and multiple (four) antennas 21-24. In order for the MS 20 to connect to a subset (one or more) of the antennas, the CSI for the channel between possible subset of the available antennas need to be measured at the BS.

One method for measuring the CSI is described in U.S. patent application Ser. No. 11/777,356, "Method and System for Selecting Antennas Adaptively in OFDMA Networks," filed by Tao et al., on Jul. 13, 2007, incorporated herein by reference.

More specifically, in the downlink case from the BS to the MS, the MS can estimate the channel based on the pilot signal received from the BS. In the uplink case from the MS to the BS, the BS can estimate the channel based on the pilot signal received from the MS.

Figure 5:
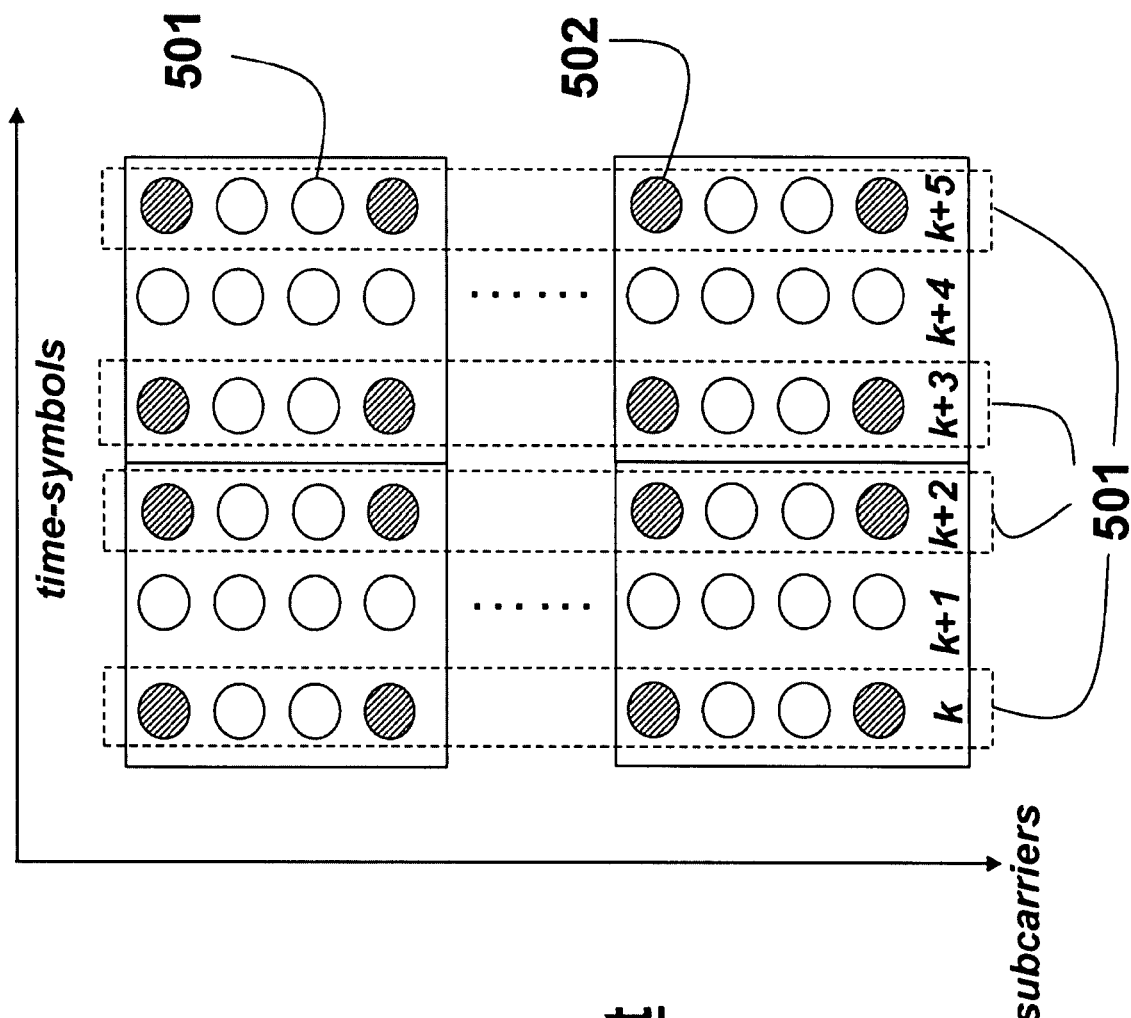
FIG. 5 is a schematic of a prior art uplink PUSC zone.

The IEEE 802.16 standard allows a number of permutations to interleave the data subcarriers and the pilot subcarriers over time. For example as shown in FIG. 5, the uplink partial usage subcarrier (UL PUSC) permutation defined in the IEEE 802.16 standard embeds pilot subcarriers in the channel resource every other OFDMA symbol 501. So, both data 511 and pilot 512 subcarriers exist in OFDMA symbols k, k+2, k+4, and so on. At symbol k, for instance, MS transmits both pilot and data subcarrier to BS in PUSC permutation mode.

To minimize the interruption for transceiving data, the switch, from one subset of candidate antennas to another subset, is performed during the cyclic prefix period 301, which can cause some loss in orthogonality of the signal, but no loss of data. On the uplink side, the BS measures the CSI, selects a set of antennas, and notifies the MS of its selection. Then, the MS can connect its RF chains to the selected subset of antennas for subsequent communications.

There are a number of issues with measuring the CSI in the way describe above for the purpose of antenna selection.

While measuring the CSI, the MS does not yet know which subset of antennas will be selected. Neither does the MS know whether the modulation and coding schemes for the current subset of selected antennas can be sustained when the next subset of antennas is selected.

Figure 6:
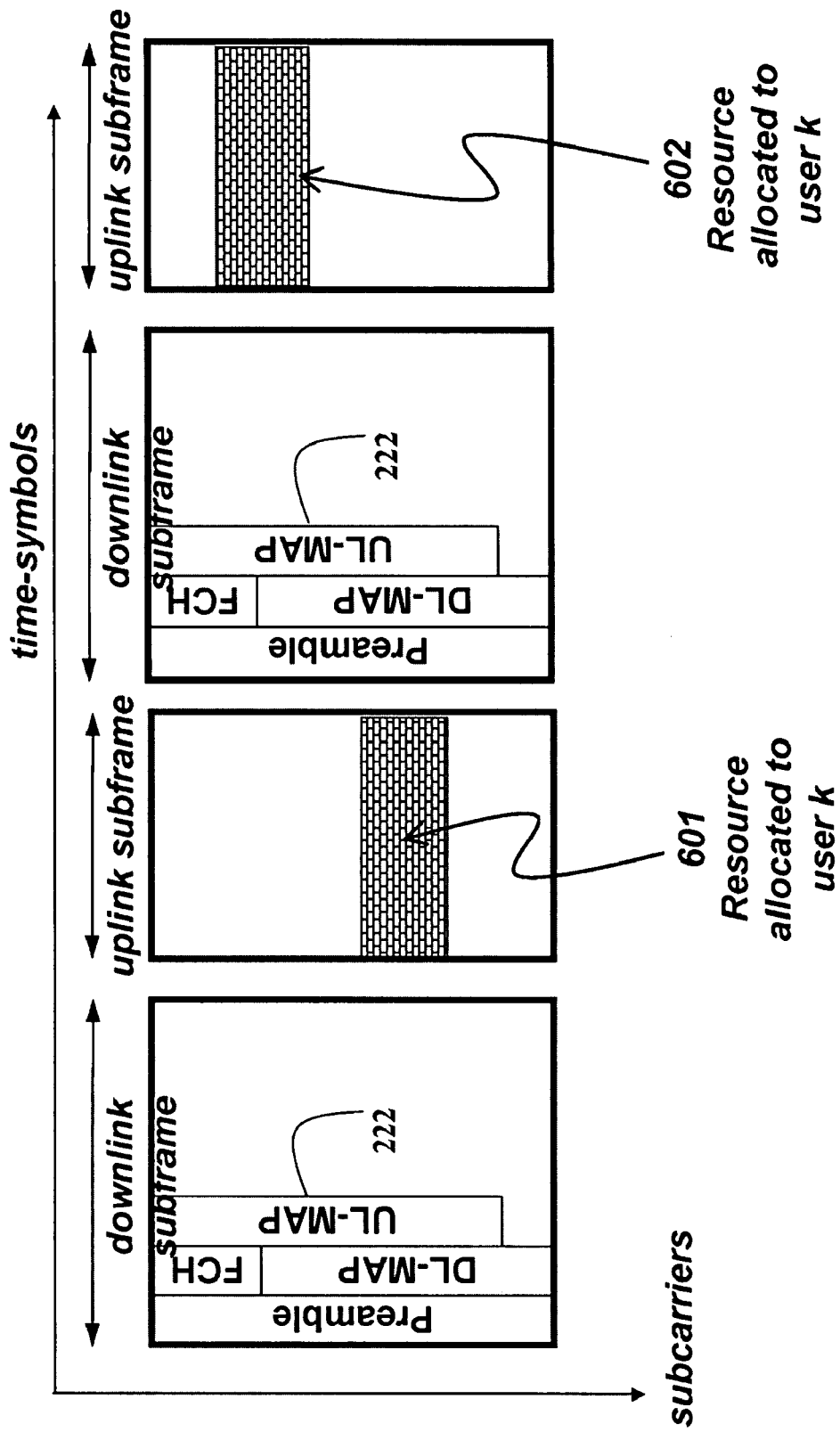
FIG. 6 is a schematic of using different channel resource in different frames for a mobile station according to embodiment of the invention.

As shown in FIG. 6, the BS can schedule the MS to transceive using different channel resources 601-602 in different subframes. Thus, the channel state obtained during antenna selection cannot be applicable for the channel resource assigned to the MS in a subsequent frame. Thus, sounding for the purpose of antenna selection has a number of issues that are not present for conventional sounding.

Ideally, the BS would like to know the CSI for each subset of antennas across all available subcarriers. Based on the CSI for every MS, the BS can perform antenna selection. Therefore, the BS specifies the resource, i.e., subcarrier and symbol that the MS measures.

Uplink Sounding for Antenna Selection at Mobile Station

Figure 7:
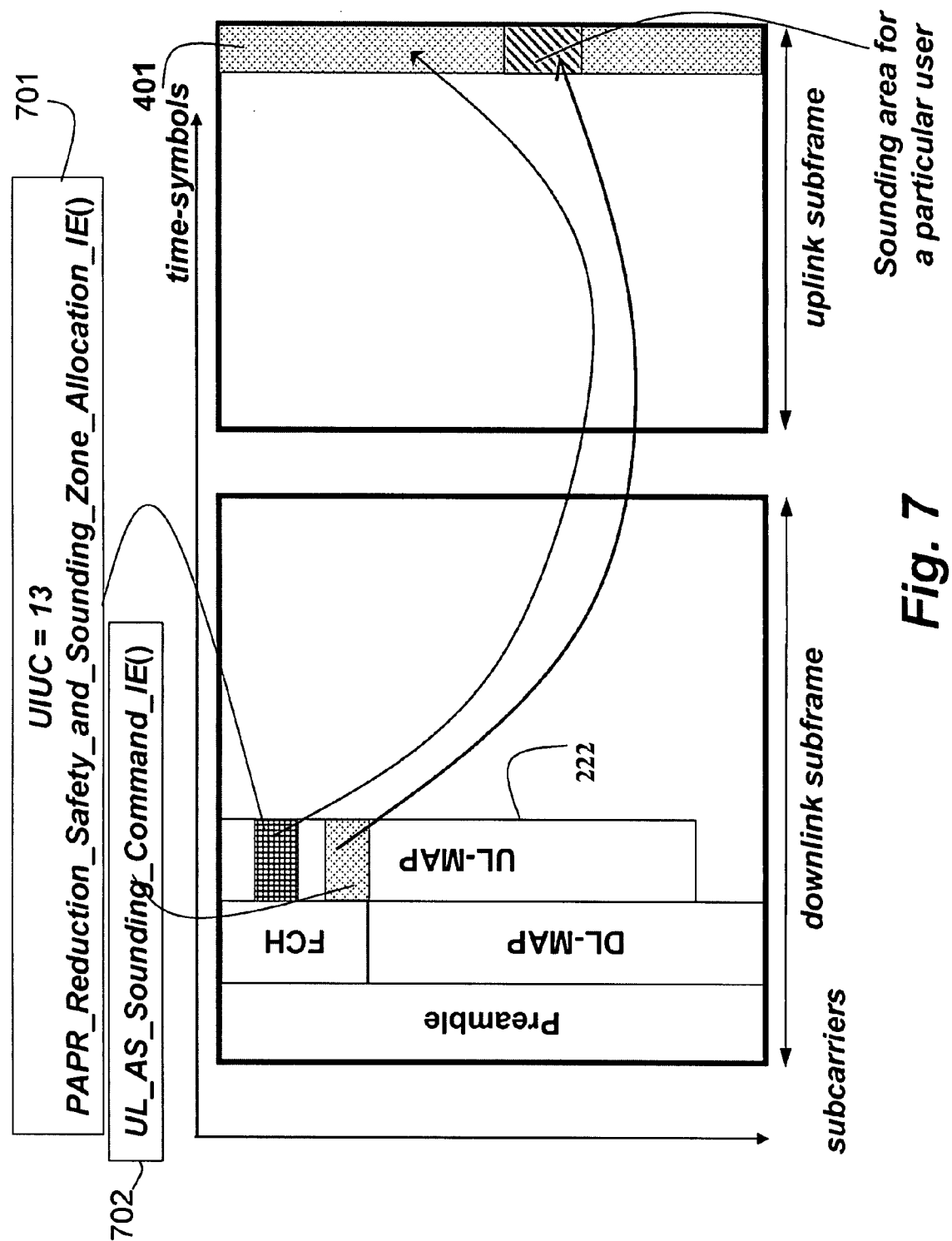
FIG. 7 is a schematic of signaling for uplink sounding for antenna selection according to embodiments of the invention.

As shown in FIG. 7, a base station first transmits an UL-MAP_IE( ) with UIUC=13 with PAPR_Reduction_Safety_and_Sounding_Zone_Allocation_IE( ) 701 to indicate the allocation of the uplink sounding zone 401 in the uplink subframe of the current frame. The format of the field is shown in Table 1 and Table 2 of the Appendix. The sounding zone 401 includes a set (one or more) OFDMA symbols in the uplink subframe.

Then, the BS can use the antenna selection signal to measure the CSI for different sets of antennas used by the MS, and direct the MS to use a selected set of antennas for the subsequent frames.

The BS can send an UL-MAP message including a UL_AS_Sounding_Command_IE( ) to the MS, directing the MS to transmit the antenna selection signal via different subsets of candidate antennas at different OFDMA symbols within the sounding zone 401.

FIG. 7 shows the structure of the UL_AS_Sounding_Command_IE( ). If the BS requests periodic uplink sounding, then the BS signals the allocation E 701 and the UL_AS_Sounding_Command_IE( ) 702 in every appropriate frame.

The MS can perform two types of uplink sounding for antenna selection, namely: non-distributed (Type A), and distributed (Type B).

Non-Distributed Antenna Selection

Figure 8:
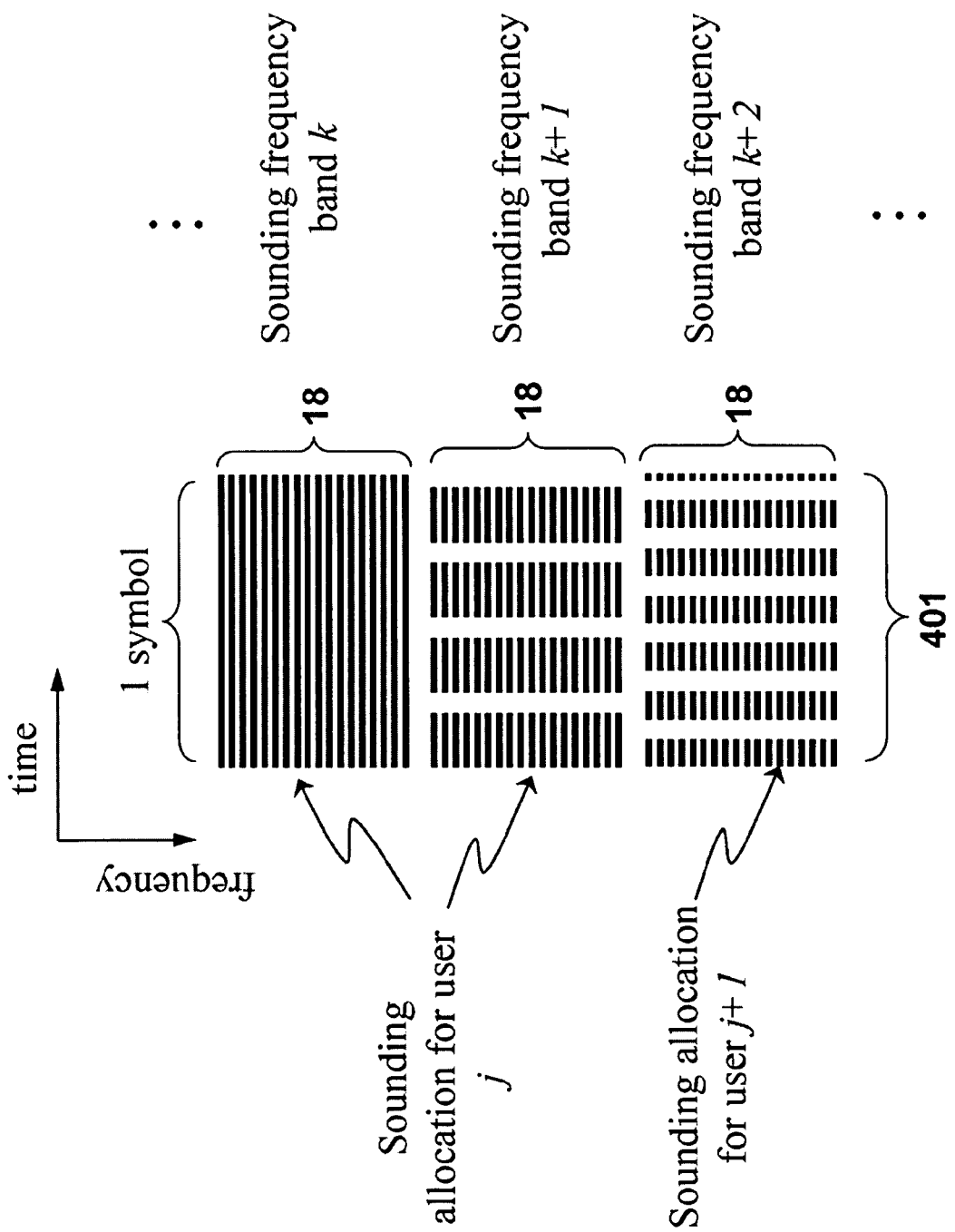
FIG. 8 is a schematic of non-distributed subcarriers allocation (Type A) for uplink sounding for antenna selection according to embodiments of the invention.

As shown in FIG. 8, the MS transmits the uplink antenna selection signal at one or more specific symbol intervals and specific contiguous subcarriers within the sounding zone 401. The OFDMA frequency bandwidth within the sounding zone is partitioned into non-overlapping contiguous sounding frequency bands (k). For example, each frequency band includes eighteen (18) contiguous OFDMA subcarriers.

For the 2048-FFT size, the sounding zone contains at most 1728/18=96 sounding frequency bands, where 1728 is the number of subcarriers. For other FFT sizes, each sounding band includes eighteen contiguous subcarriers, while the number of possible sounding frequency bands across the signal bandwidth can vary. FIG. 8 shows contiguous sounding allocations for users (mobile stations) j and j+1, and sounding frequency bands k, k+1, and k+2.

Distributed Antenna Selection

Figure 9:
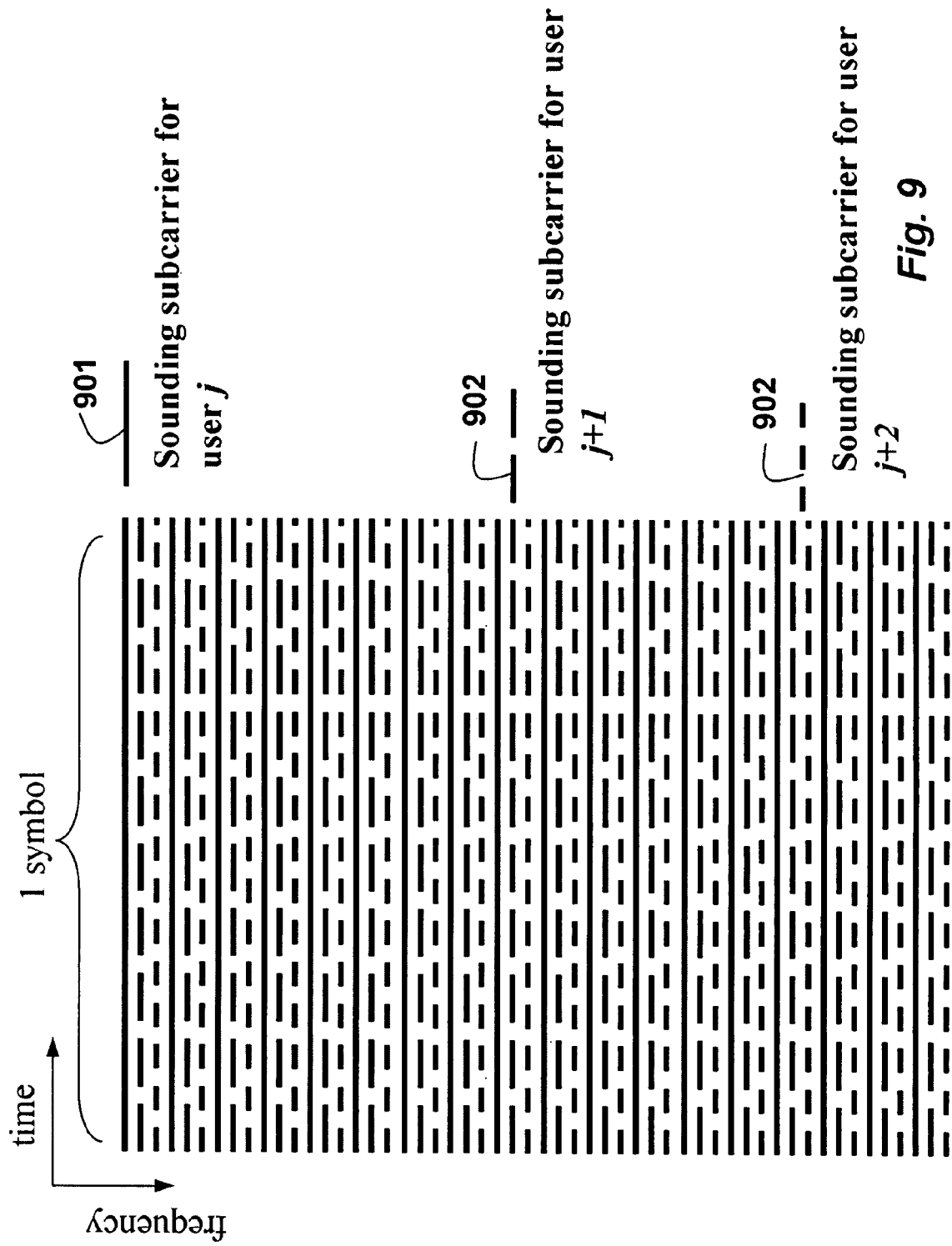
FIG. 9 is a schematic of distributed subcarriers allocation (Type B) for uplink sounding for antenna selection according to embodiments of the invention.

As shown in FIG. 9, the MS transmits the antenna selection signal on a band allocated according to a specified DL subcarrier allocation and permutation such as partial usage subcarrier (PUSC) permutation. Essentially, the frequency bands 901-903 are interleaved or alternating. FIG. 9 shows distributed antenna selection allocations for users (mobile stations) j, j+1, and j+2.

Sounding Signal Orthogonality

The IEEE 802.16 standard specifies two methods of maintaining sounding signal orthogonality so that multiple MSs can be multiplexed in the UL sounding zone.

Cyclic Shift Orthogonality

Figure 10:
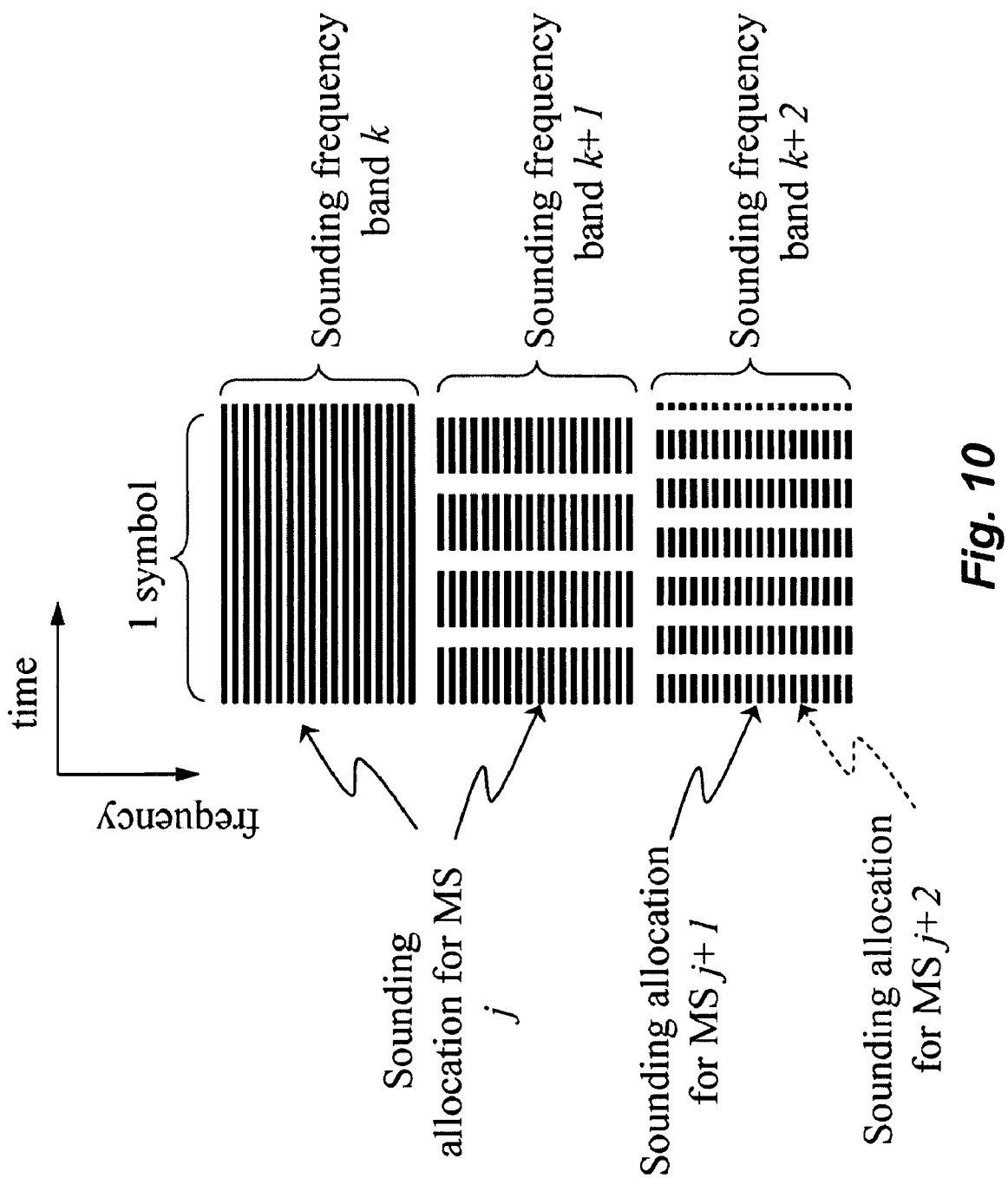
FIG. 10 is a schematic of cyclic shift separability for uplink sounding for antenna selection according to embodiments of the invention.

As shown in FIG. 10 for MSs j, j+1, and j+2 and sounding frequency bands k, k+1, and k+2, each MS uses all the subcarriers within the sounding allocation. Different MSs use the same sounding sequence multiplied by a different frequency-domain phase shift.

As shown in FIG. 10, both MS j+1 and MS j+2 use the same sounding frequency band k+2. To maintain the orthogonality of their sounding signals to be transmitted to the BS, MS j+1 and MS j+2 respectively apply a frequency-domain phase shift to the same sounding sequence.

Decimated Orthogonality

Figure 11:
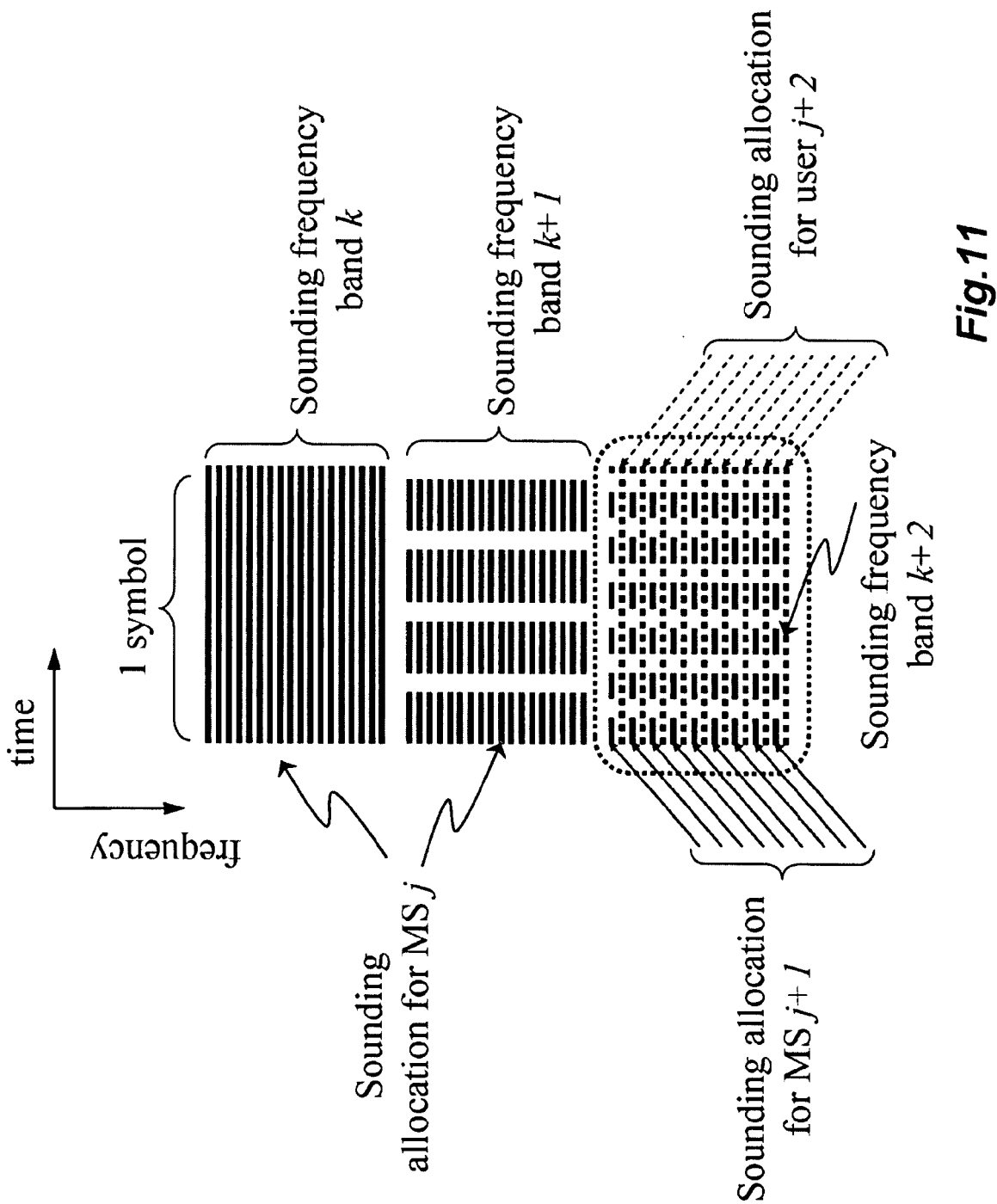
FIG. 11 is a schematic of decimated separability for uplink sounding for antenna selection according to embodiments of the invention.

As shown in FIG. 11 for MSs j, j+1, and j+2 and sounding frequency bands k, k+1, and k+2, both MS j+1 and MS j+2 use the same sounding frequency band k+2. The MSs can use a set of decimated subcarriers, e.g., every $16^{th}$ subcarrier. Multiple MSs can occupy the same sounding allocation, but each MS uses a set of non-overlapping subcarriers within the sounding allocation. As shown in FIG. 11, MS j+/and MS j+2 share the same sounding allocation, but non-overlapping alternate subcarriers in that allocation.

Enabling Antenna Selection

To enable antenna selection according to embodiments of the invention, the BS has to inform the MSs that the MSs transmit the antennas selection sounding signals via different antenna subsets in different OFDMA symbols, according to the embodiments of the invention.

The UL AS Sounding Command IE detailed in Table 3 of the Appendix supports the conventional uplink sounding and the antenna selection according to the embodiments of the invention.

More specifically, if the three-bit field "Number of AS sounding symbols" associated with a CID in UL AS Sounding Command IE is set to 0, then the MS with that CID only performs conventional uplink sounding for channel estimation (CSI), and not the uplink sounding for antenna selection.

However, if the "Number of AS sounding symbols" field has a non-zero value, e.g., "k", then the MS uses a different subset of the available antennas to transmit antennas selection sounding signals in the specified symbol and the k symbols that immediately follow. In other words, a non zero value in this field causes the MS to transmit antenna selection signals that are used by the BS for the purpose of antenna selection.

Note that all other configurations, such as separability, the starting frequency band, the number of frequency bands, permutation, subchannel offset, number of subchannels, etc., remain the same during the antenna selection.

Figure 12:
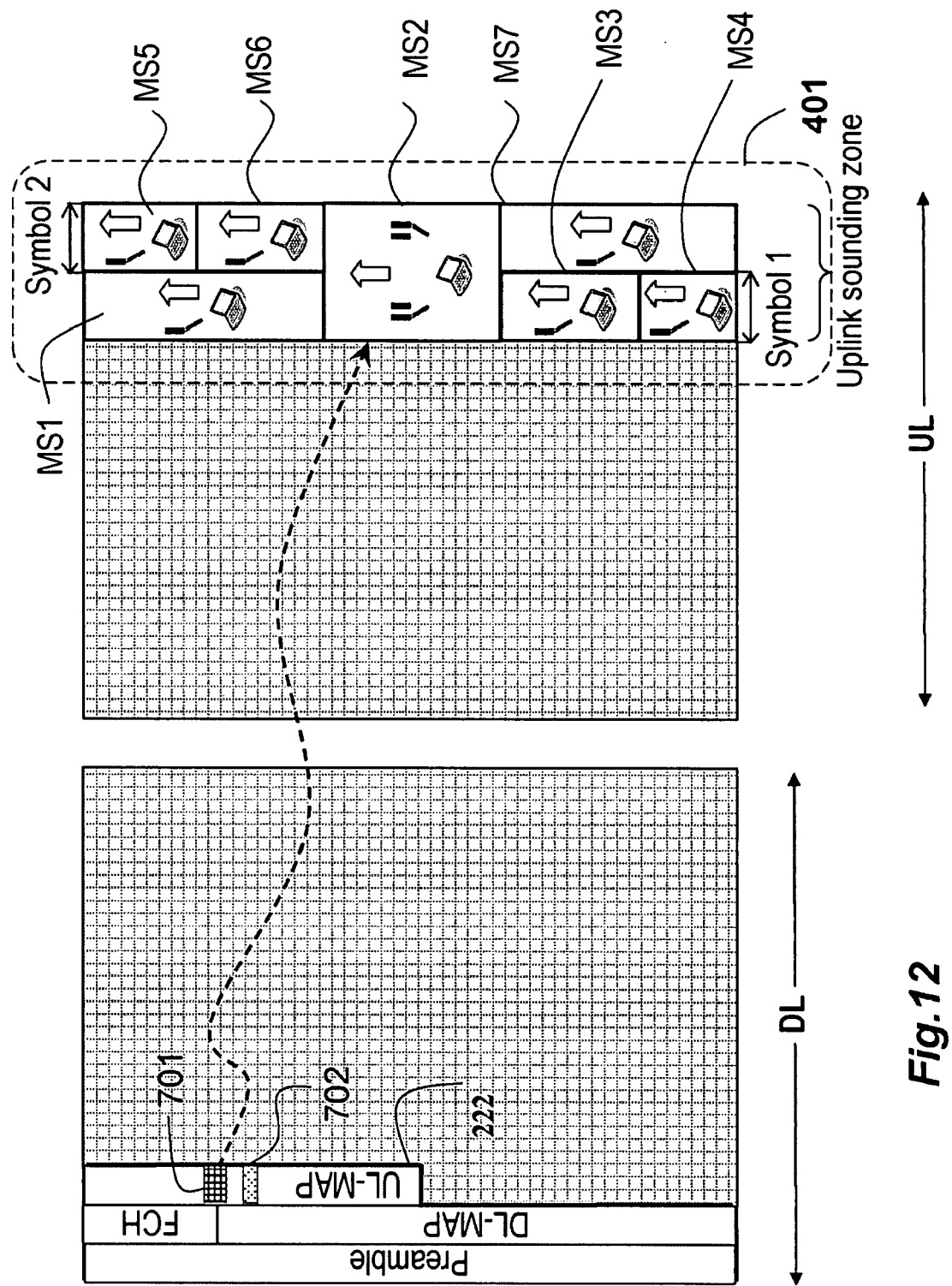
FIG. 12 is a schematic of coexistence of conventional uplink sounding and uplink sounding for antenna selection according to embodiments of the invention.

FIG. 12 shows the co-existence of conventional sounding and antenna selection according to the embodiments of the invention. The PAPR_Reduction_

Safety_and_Sounding_Zone_Allocation_IE( ) 701 in the UL-MAP 222 specifies the allocated uplink sounding zone in terms of the starting symbol (time) and the number of OFDMA symbols.

The UL_AS_Sounding_Command_IE( ) 702 informs each MS that does not a have need or capability to do antenna selection of its subchannel and symbol allocation for conventional uplink sounding in the sounding zone 401 and the associated sounding configuration.

In Symbol 1 in FIG. 12, MS1, MS3 and MS4, which are the MSs with one antenna, the MS transmit uplink the sounding signal in the allocated uplink resource for conventional uplink channel sounding. In Symbol 2 in FIG. 12, similarly, MS5, MS6 and MS7, which are the MSs with only 1 antenna, transmit uplink sounding signal in the uplink resource assigned to the MS for conventional uplink sounding.

The UL_AS_Sounding_Command_IE( ) 702 of the format defined in Table 3 according to the embodiments of the invention informs the MS of its subchannel and symbol allocation for antenna selection in the sounding zone 401, and the associated sounding configuration. As instructed by BS in UL_AS_Sounding_

Command_IE( ), The MS2 uses one antenna to transmit the uplink antenna selection signal in symbol 1, and uses the other antenna to transmit the uplink antenna selection signal in symbol 2. The BS then selects the antenna MS shall use in the uplink for transmission, based on the CSI for the antenna selection signals.

Figure 13:
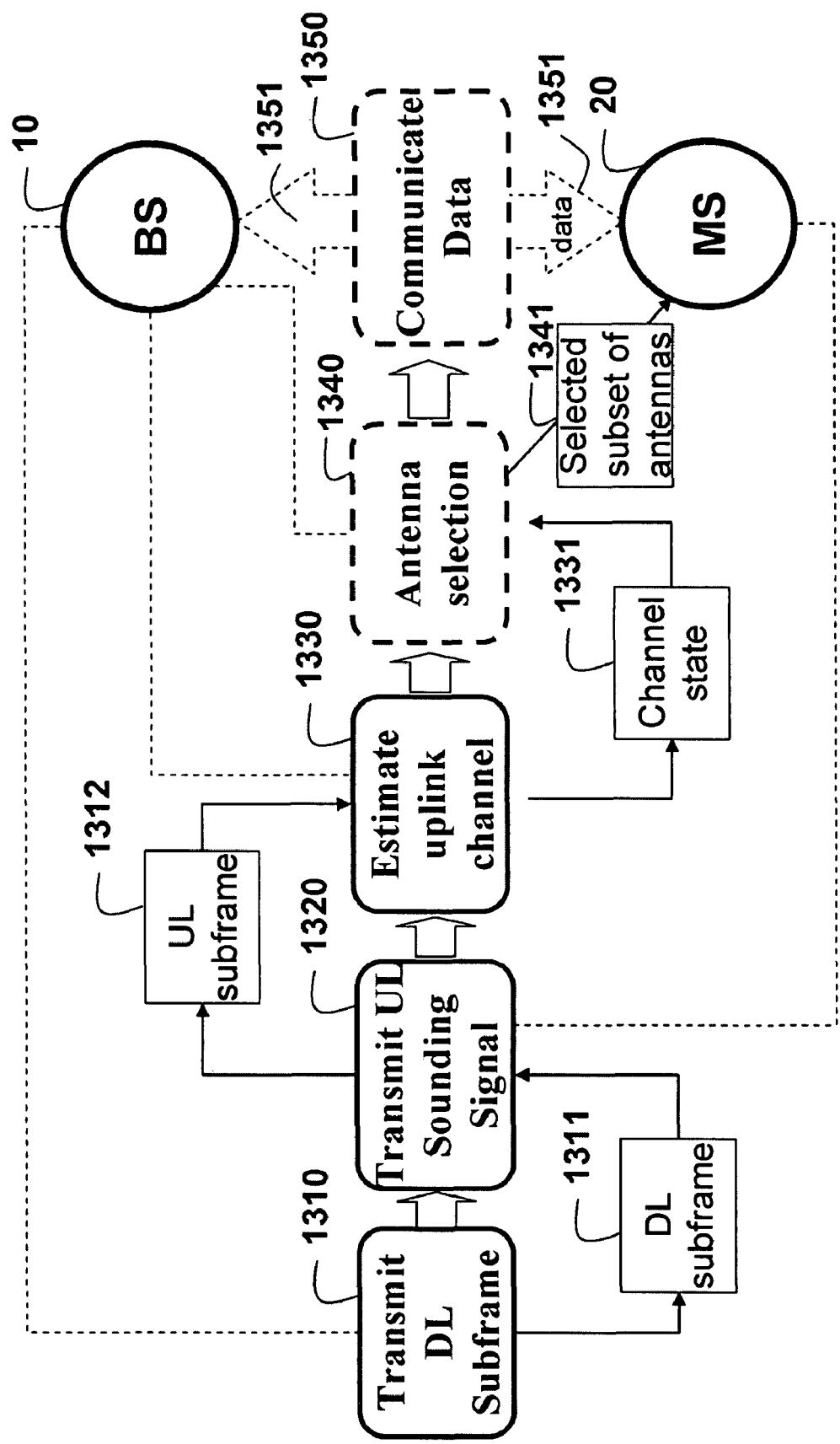
FIG. 13 is a flow diagram of a method for antenna selection according to an embodiment of the invention.

FIG. 13 shows the general method for antenna selection according to the embodiments of the invention.

The base station 10 transmits 1310 the down-link (DL) subframe 1311. The DL subframe allocates one or more symbols and one or more subcarriers of an up-link (UL) subframe 1312 for antenna selection signals. Then, the mobile station 20 transmits 1320 the UL antenna selection signals to the base station using different subsets of antennas at different symbols. The base station estimates 1330 individually the uplink channel states 1340 between the BS and the multiple antenna subsets at mobile station. The BS selects 1340 a particular subset 1341 of the antennas. Subsequently, the base station 10 and the mobile station 20 can communicate 1350 data 1351 using the selected subset of antennas.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

TABLE 1

IEEE 802.16 UL-MAP_IE format with UIUC = 13

| Syntax | Size (bit) | Notes |
|---|---|---|
| UL-MAP_IE( ) { | — | — |
| CID | 16 | — |
| UIUC = 13 | 4 | — |
| PAPR_Reduction_and_Safety_Zone_Allocation_IE | 32 | — |
| } | — | — |

TABLE 2

IEEE 802.16 PAPR_Reduction_and_Safety_Zone_Allocation_IE format

| Syntax | Size (bit) | Notes |
|---|---|---|
| PAPR_Reduction_and_Safety_Sounding_Zone_Allocation_IE( ) { | — | — |
| OFDMA symbol offset | 8 | — |
| Subchannel offset | 7 | — |
| Number of OFDMS symbols | 7 | — |
| Number of subchannels | 7 | — |
| PAPR Reduction/Safety Zone | 1 | 0 = PAPR reduction allocation<br>1 = Safety zone allocation |
| Sounding Zone | 1 | 0 = PAPR/Safety Zone<br>1 = Sounding zone allocation |
| Reserved | 1 | Shall be set to 0 |
| } | — | — |

TABLE 3

UL AS Sounding Command IE format

| Syntax | Size (bit) | Notes |
|---|---|---|
| UL_AS_Sounding_Command_IE( ) { | — | — |
| Extended-2 UIUC | 4 | UL_AS_Sounding_Command_IE( ) = 0x05 |
| Length | 8 | Variable |
| Sounding_Type | 1 | 0 = Type A, 1 = Type B |
| Send Sounding Report Flag | 1 | — |
| Sounding_Relevance_Flag | 1 | 0 = Sounding relevance is the same for all CIDs<br>1 = Sounding relevance is specified for each CID |
| If (Sounding_Relevance_Flag == 0) { | — | — |
| Sounding_Relevance | 1 | 0 = All CIDs respond in the frame carrying the instruction<br>1 = All CIDs respond in next frame |
| Reserved | 2 | Shall be set to zero |
| } else { | — | — |
| Reserved | 3 | Shall be set to 0 |
| } | — | — |
| Include additional feedback | 2 | 0b00 = No additional feedback<br>0b01 = Include channel coefficients<br>0b10 = Include received sounding coefficients<br>0b11 = Include feedback message |

TABLE 3-continued

UL AS Sounding Command IE format

| Syntax | Size (bit) | Notes |
| --- | --- | --- |
| If (Sounding_Type == 0) { | — | (Type A sounding) |
| Num_Sounding_Symbols | 3 | Total number of sounding symbols being allocated, from 1 (0b000) to 8 (0b111) |
| Separability Type | 1 | 0: occupy all subcarriers in the assigned bands; <br> 1: occupy decimated subcarriers |
| If (Separability type == 0) { | — | (Using cyclic shift separability) |
| Max Cyclic Shift Index P | 3 | 0b000: P = 4, 0b01: P = 8, 0b010: P = 16, 0b011: P = 32, 0b100: P = 9, 0b101: P = 18, 0b110-0b111: Reserved |
| Reserved | 1 | Shall be set to 0 |
| } else { | — | (Using decimated separability) |
| Decimation value D | 3 | Sound every Dth subcarrier within the sounding allocation. Decimation value D is 2 to the power of (1 plus this value), hence 2, 4, 8, . . . up to maximum of 128, and 0b111 mean decimation of 5. |
| Decimation offset randomization | 1 | 0 = no randomization of decimation offset <br> 1 = decimation offset pseudo-randomly determined |
| } | — | — |
| For (i = 0; i<Num_Sounding_symbols; i++) { | — | — |
| Sounding symbol index | 3 | Symbol index within the Sounding Zone, from 1 to 8 |
| Number of CIDs | 6 | Number of CIDs sharing this sounding allocation |
| Reserved | 3 | Shall be set to 0 |
| For (j=0; j<Num of CIDs, j++) | — | — |
| Short basic CID | 12 | 12 LSBs of the MS basic CID value |
| Power assignment method | 2 | 0b00 = equal power, 0b01 = reserved. 0b10 = interference dependent; per subcarrier power limit <br> 0b11 = interference dependent; total power limit |
| Power boost | 1 | 0 = no power boost <br> 1 = power boost |
| Multi-antenna flag | 1 | 0 = MS sounds first antenna only <br> 1 = MS sounds all antenna |
| Allocation mode | 1 | 0 : Normal <br> 1 : Band AMC |
| If (Allocation mode == 1) { | — | — |
| Band bit map | 12 | |
| Reserved | 2 | Shall be set to 0 |
| } else { | — | — |
| Starting frequency band | 7 | Out of 96 bands at most (FFT size dependent) |
| Number of frequency bands | 7 | Contiguous bands used for sounding |
| } | — | — |
| If (Sounding Relevance Flag == 1) { | — | — |
| Sounding_Relevance | 1 | |
| } else { | — | |
| Reserved | 1 | Shall be set to 0 |
| } | — | — |
| If (Separability Type == 0) { | — | — |
| Cyclic time shift index m | 5 | Cyclically shifts the time domain symbol by multiple (from 0 to P − 1) of N/P where N = FFT size, and P = Max Cyclic Shift Index |
| } else { | — | — |
| Decimation offset d | 6 | Relative starting offset position for the first sounding occupied subcarrier in the sounding allocation |
| If (Include additional feedback == 0b01) { | — | — |
| Use same symbol for additional feedback | 1 | 0 = The additional feedback is sent in the symbol(s) following the allocated sounding symbol, <br> 1 = The additional feedback is sent in the same symbol as the allocated sounding symbol. |
| Reserved | 2 | Shall be set to 0 |
| } else { | — | — |
| Reserved | 3 | Shall be set to 0 |
| } | — | — |
| } | — | — |
| Periodicity | 3 | 0b000 = Single command, not periodic, or terminate periodicity. Otherwise, repeat sounding once per r frames, where $r = 2^{(n-1)}$, |

TABLE 3-continued

UL AS Sounding Command IE format

| Syntax | Size (bit) | Notes |
|---|---|---|
| Number of AS sounding symbols | 3 | where n is the decimal equivalent of the periodicity field. Number of OFDMA symbols immediately following the UL sounding symbol in this sounding zone that will be used for the sounding for uplink antenna selection |
| } | — | — |
| } | — | — |
| } else { | | |
| Permutation | 3 | 0b000 = PUSC perm<br>0b001 = FUSC perm<br>0b010 = Optional FUSC perm<br>0b011 = PUSC-ASCA<br>0b100 = TUSC1<br>0b101 = TUSC2<br>0b110 = AMC (2x3)<br>0b111 = Reserved |
| DL_PermBase | 6 | |
| Num_Sounding_symbols | 3 | |
| For (i = 0; i <Num_sounding_symbols; i++) { | — | |
|   Number of CIDs | 7 | |
|   Reserved | 1 | |
|   For (j=0; j<Number of CIDs; j++) { | — | |
|     Shortened basic CID | 12 | 12 LSBs of the MS basic CID value |
|     If (Sounding_Relevance_Flag == 1) { | — | |
|       Sounding_Relevance | 1 | 0 = respond in the frame carrying the instruction<br>1 = respond in next frame |
|       Reserved | 3 | Shall be set to 0 |
|     } | — | |
|     Subchannel offset | 7 | The lowest index subchannel used for carrying the burst, starting from subchannel 0 |
|     Power boost | 0 | 0 = no power boost<br>1 = power boost |
|     Number of subchannels | 3 | The number of subchannels with subsequent indexes, used to carry the burst |
|     Periodicity | 3 | 0b000 = Single command, not periodic, or terminate periodicity. Otherwise, repeat sounding once per r frames, where $r = 2^{(n-1)}$, where n is the decimal equivalent of the periodicity field. |
|     Number of AS sounding symbols | 3 | Number of OFDMA symbols immediately following the UL sounding symbol in this sounding zone that will be used for the sounding for uplink antenna selection |
|     Power assignment method | 2 | 0b00 = equal power<br>0b01 = reserved<br>0b10 = interference dependent; per subcarrier power limit<br>0b11 = interference dependent; total power limit |
|     } | — | — |
|   } | — | — |
| } | | |
| Padding | variable | Pad IE to octet boundary. Bits shall be set to 0 |
| } | — | — |

DEFINITIONS

Slot: A slot is the minimum resource unit allocated to an MS in UL and DL. A slot is two dimensional and is measured in time duration and frequency subcarriers.

Antenna Selection (AS): AS is used during transmitting and receiving at the MS or the BS to optimize the system performance. AS can be classified into Transmit Antenna Selection (TAS) and Receive Antenna Selection (RAS), which are intended to select antenna for transmitting and receiving, respectively.

Sounding Subcarrier: In IEEE 802.16, the subcarriers are divided into several groups, including data subcarriers, sounding subcarriers, DC subcarriers, and guard subcarriers. The receiver uses received signal on sounding subcarriers to estimate the channel. The allocation of sounding subcarriers in the entire set of subcarriers depends on the permutation mode.

Data Subcarrier: Data subcarrier is the subcarrier used for data transmissions.

Guard Subcarrier: Guard subcarrier is the subcarrier used to avoid inter-spectrum interference between two frequency bands.

Permutation Zone: A permutation zone is a number of contiguous OFDMA symbols in the DL or the UL. A permutation zone can include multiple users that use the same permutation formula. The permutations primarily differ in their slot size, the number and location of data and sounding subcarriers, and whether the subcarrier grouping is adjacent or distributed.

We claim:

1. A method for selecting antennas in an orthogonal frequency division multiple access (OFDMA) network, in which the network includes a base station and a plurality of mobile stations, in which the base station and the plurality of mobile stations communicate with each other using frames, comprising:
    transmitting a down-link (DL) subframe of a frame from a base station to a mobile station in an OFDMA network, in which the mobile station includes a plurality of antennas, and in which the DL subframe allocates one or more symbols and one or more subcarriers of an up-link (UL) subframe of the frame for antenna selection signals, in which the one or more symbols and the one or more subcarriers comprise a sounding zone that includes at least one symbol and all subcarriers of the UL subframe;
    transmitting the UL subframe including the antenna selection signals at the allocated subcarriers and symbols to the base station; and
    selecting a subset of the plurality of antennas in the base station based on the antenna selection signals.

2. The method of claim 1, in which the antenna selection signals are transmitted by the mobile station using different subsets of the plurality of antennas.

3. The method of claim 1, in which the base station and the mobile station exchange data signals using the selected subset of antennas.

4. The method of claim 2, in which the mobile station switches between the different subsets of antennas during a cyclic prefix period of each symbol of the UL subframe.

5. The method of claim 1, in which the antenna selection signals are transmitted in response to a UL_AS_Sounding_Cmmand_IE( ) command in a UL-MAP of the DL subframe.

6. The method of claim 1, in which the antenna selection signals are contiguous over the subcarriers.

7. The method of claim 1, in which the antenna selection signals are distributed over the subcarriers.

8. The method of claim 1, in which the DL subframe is transmitted to a plurality of the mobile stations, and in which the plurality of mobile stations each transmit the UL subframe to the base station, and the base station selects the subset of the antennas for the plurality of mobile stations.

9. The method of claim 8, further comprising:
    maintaining orthogonality in the antenna selection signals so that plurality of mobile stations can multiplex the antenna selection signals in the UL subframe.

10. The method of claim 1, in which the one or more symbols and the one or more subcarriers comprise a sounding zone that includes two symbols and all subcarriers of the UL subframe.

11. The method of claim 9, further comprising:
    decimating the orthogonality over the subcarriers.

12. The method of claim 1, further comprising:
    specifying a number of the symbols in an UL_AS_Sounding_Command_IE( ) command of the DL subframe.

13. A system for selecting antennas in an orthogonal frequency division multiple access (OFDMA) network, in which the network includes a base station and a plurality of mobile stations, in which the base station and the plurality of mobile stations communicate with each other using frames, comprising:
    a base station configured to transmit a down-link (DL) subframe of a frame to a mobile station in an OFDMA network, in which the mobile station includes a plurality of antennas, and in which the DL subframe allocates one or more symbols and one or more subcarriers of an up-link (UL) subframe of the frame for antenna selection signals, and in which the base station further comprises:
    means for selecting a subset of the plurality of antennas in the base station based on the antenna selection signals transmitted in the UL subframe by the mobile station at the allocated subcarriers and symbols, wherein the antenna selection signals are transmitted by the mobile station using different subsets of the plurality of antennas, and wherein the mobile station switches between the different subsets of antennas during a cyclic prefix period of each symbol of the UL subframe.

* * * * *